(12) United States Patent
Martínez

(10) Patent No.: US 6,272,837 B1
(45) Date of Patent: Aug. 14, 2001

(54) CONNECTING SHACKLE FOR CHAINS HAVING ORTHOGONALLY-PLANED CLOSING MEANS

(75) Inventor: Eduardo López Martínez, Algorta (ES)

(73) Assignee: Vincinay Cadenas, S.A., Bilbao (ES)

( * ) Notice: Subject to any disclaimer, the term of this patent is extended or adjusted under 35 U.S.C. 154(b) by 0 days.

(21) Appl. No.: 09/439,633

(22) Filed: Nov. 12, 1999

(30) Foreign Application Priority Data

Nov. 13, 1998 (ES) .................................................. 9802385

(51) Int. Cl.⁷ .................................................. F16G 15/04
(52) U.S. Cl. .................................................. 59/85
(58) Field of Search .................................. 59/89, 85, 86

(56) References Cited

U.S. PATENT DOCUMENTS

| | | | |
|---|---|---|---|
| 1,386,732 | * 8/1921 | Reid et al. | 59/85 |
| 1,776,515 | * 9/1930 | Leahy et al. | 59/85 |
| 2,382,344 | * 8/1945 | St. Pierre | 59/85 |
| 2,398,897 | * 4/1946 | St Pierre | 59/85 |
| 3,246,464 | * 4/1966 | Schommer | 59/85 |

FOREIGN PATENT DOCUMENTS

156780 * 3/1904 (DE) ......................................... 59/85

* cited by examiner

Primary Examiner—David Jones
(74) Attorney, Agent, or Firm—Klauber & Jackson

(57) ABSTRACT

A connecting shackle to facilitate the release of the guide-chain that normally links a chain for naval use used in the setting of the position of ships or oil recovery platforms, including a chain linked-shaped body. The body has an open section that is closed and opened to facilitate the corresponding linking and separating between the chains, by a first piece and second piece (4 and 5) fastenable together by transversal screws (6), and the pieces (4 and 5) are provided with recesses (11–12) complementary of end extensions (3–3') of the open section of the body (1) of the shackle.

7 Claims, 5 Drawing Sheets

CONNECTING SHACKLE FOR CHAINS HAVING ORTHOGONALLY-PLANED CLOSING MEANS

OBJECT OF THE INVENTION

As expressed in the title of this specification, the present invention refers to a connecting shackle for chains to simply and efficiently carry out the release and tightening of the chains used in the naval sector, and specifically the so-called guide-chains that are linked to the main chains, the shackle a chain link shaped body with a substantially oval contour, preferably with a circular section.

The object of the invention is to provide a shackle whose body has an open section that is closed by means of the fastening together of two complementary pieces, with the ease of becoming independent and disassembling rapidly in order to simply and quickly carry out the separation of the guide-chain the main chain in said operations of release and tightening of the main chain.

BACKGROUND OF THE INVENTION

As is well known, in the naval sector, for the setting of the position of ships or oil recovery platforms, conventional anchors and the corresponding chains that attach the anchor to the ship or to the platform, are used for the setting of the position of ships or oil recovery platforms. Said chains are formed by means of links that connected together form sections of a specific length, and said sections are connected by means of connecting shackles with different shapes.

The chain thus formed is released and tightened by means of a pulley-capstan type mechanism, such as a drum, upon whose surface said chain in question and specifically the links that form it rest and slide.

To facilitate the movement of releasing and tensing or tightening the chain, the surface of the drum has the corresponding hollows or indentations that have a shape similar to that of the link itself of the chain.

On the other hand, connecting shackles tend to have a diametral section identical to that of the link, but with a different size and shape, and therefore to release and tighten the chain it is necessary that the shackle be always placed in a specific position with respect to the drum.

In the release and tightening of the main chain a guide-chain is also used, guide-chain that is not bound to comply with the specific resistance conditions of said main chain, fastening said guide-chain by means of a shackle in such a way that when the release and/or tightening of the main chain has taken place, it is necessary that the guide-chain be released from the main chain, by means of the opening of the connecting shackle, an operation that is not simple in most cases.

DESCRIPTION OF THE INVENTION

The connecting shackle for anchor chains is designed to allow a release and tightening of said chain without prior conditioning factors and to facilitate the release of the guide-chain in a simple manner.

In this sense, and taking into account that the connecting shackle comprises a chain link-shaped body with a substantially oval contour, a preferably circular section and size similar to those of the links of the corresponding chain, said shackle has an open section in one of its larger sections between a first end and a second end being provided with, respective extensions facing each other, preferably cylindrical, and protruding into said open section, each of said extensions having perimetric step defining a first portion and a second portion of each extension, said second portion being an outermost section with a larger contour than said first portion.

Such extensions constitute a means for positioning and assembling two complementary pieces that are fastened together by means of some transversal screws, said pieces defining the closing element of the open section of the shackle, all in such a way that the screwing of the screws or their unscrewing involves the fastening together of both pieces or the possibility of unlocking of these pieces, respectively, between the extensions facing each other of the open section of the shackle.

Said two pieces have a general shape that can be considered as prismatic-rectangular, the piece that is positioned in the inside having a pair of concave recesses that define a continuation of the concave or rounded ends of the inside of the shackle, for the correct adaptation of the links that are linked to the shackle. On its opposite surface or surface facing the piece that is positioned on the outside, it has some recesses that along with some others provided in the cited outside piece constitute means for receiving and adapting the extensions facing each other of the open section of the body of the shackle.

The outside surface of the piece positioned on the outside, is curved to define a surface continuity with that of the body of the shackle.

The first and second pieces have respective holes for the passing and screwing of the screws that fasten the pieces together, screws that will preferably be complemented with nuts for the screwing thereof instead of said screwing being done in the through holes of the pieces.

Hence, the shackle that is being described can perfectly rest on the periphery of the drum of the pulley-capstan without complying with any condition, since said shackle can move perfectly resting in the hollows of the periphery of the drum, as if it were another link of the chain.

To release the guide-chain with respect to the main chain, one simply needs to adjust the fastening screws of both consecutive pieces of the closing element, in such a way that these pieces are released and the corresponding ends that form the end extensions of the open section of the body of the shackle can be disassembled.

BRIEF DESCRIPTION OF THE DRAWINGS

To complete the description that is going to be made hereinafter and for the purpose of providing a better understanding of the characteristics of the invention, the present specification is accompanied by a set of drawings on the basis of which the innovations and advantages of the connecting shackle made in accordance with the object of the invention will be more easily understood.

DESCRIPTION OF THE PREFERRED EMBODIMENT

Figure 1:
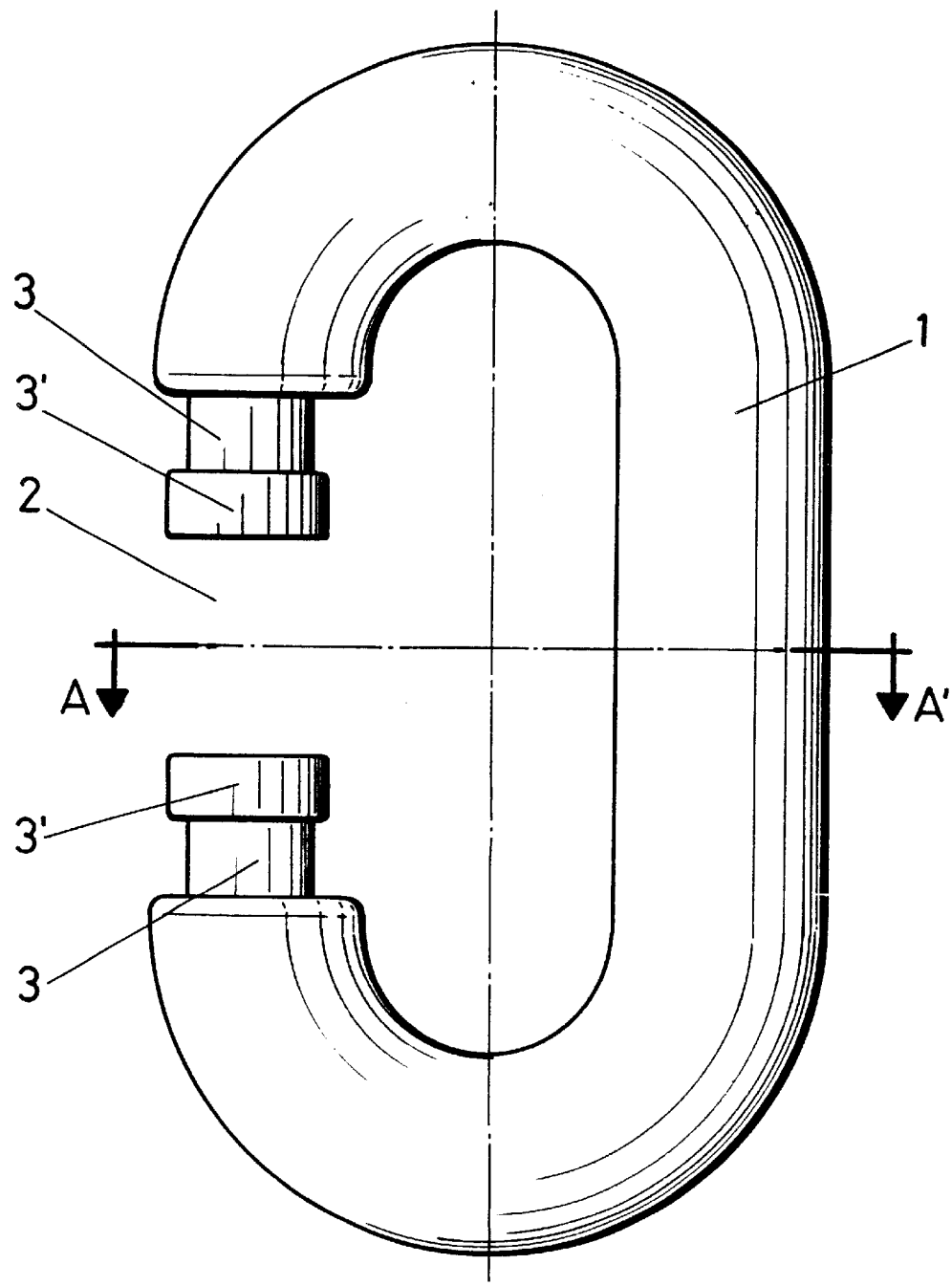
FIG. 1 is a side raised view of the body of the shackle without the two pieces that close the open section of the body.

As can be seen in FIG. 1, the shackle of the invention comprises a chain linked-shaped body (1), said body (1) has an opening in one of its larger sections (2) between a first end and a second end being provided with respective extensions (3) facing each other, and protruding into said open section, each of said extensions having a perimetric step defining a first portion and a second portion of each extension, said second portion being an outermost section with a larger contour than said first portion as clearly represented in FIG. 1.

The open section (2) of the body (1) of the shackle, is closed by means of the assembly of two pieces (4) and (5), complementary and fastened together by means of a pair of transversal screws (6). Both pieces (4) and (5) have means for adaptation to the extensions (3–3'), in order to be duly locked, after the fastening together by means of the screws (6), in that open part (2) of the body (1) of the shackle.

Figure 2:
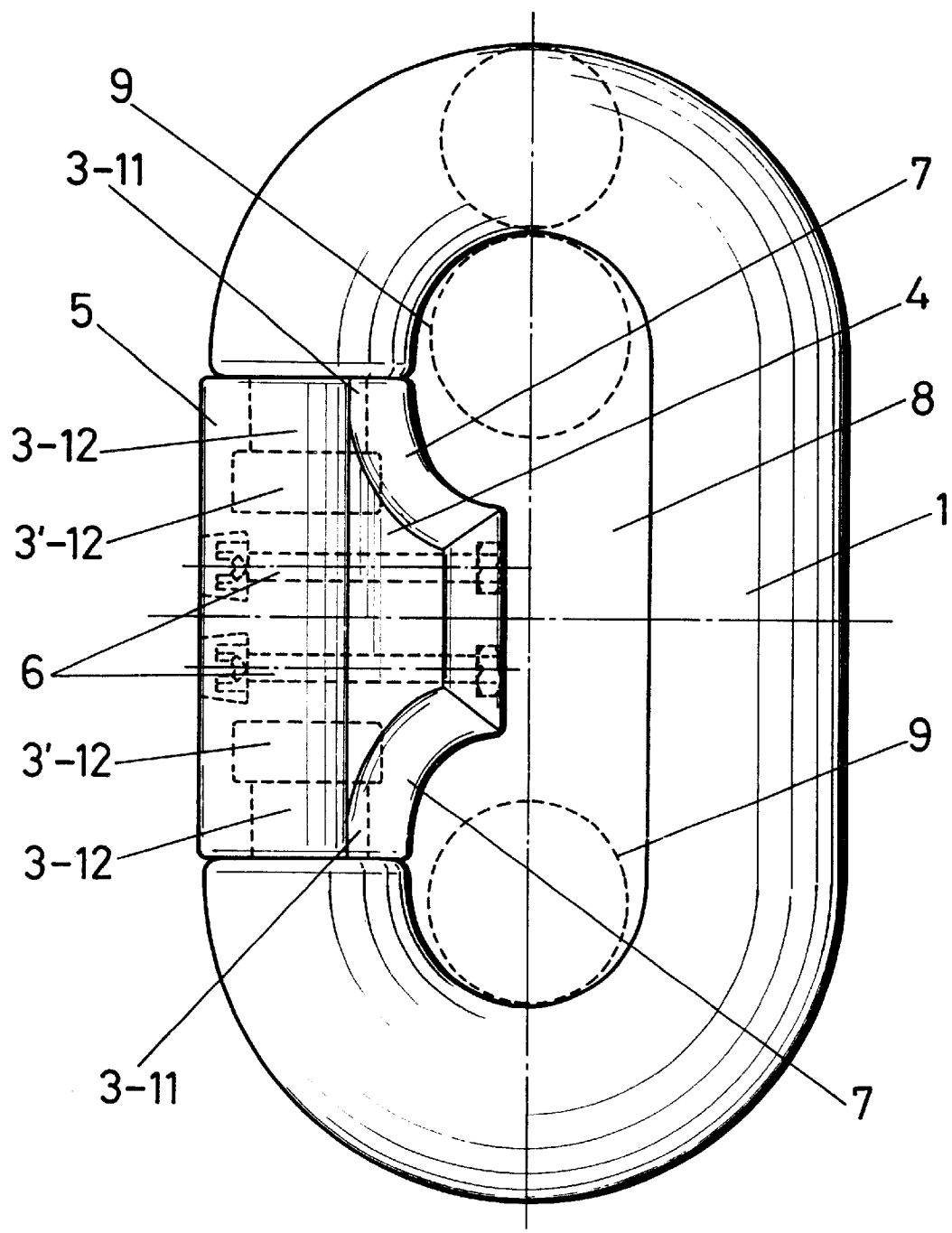
FIG. 2 shows the same side raised view of the body represented in the preceding figure, with the two pieces fastened together and assembled in the open part of the cited body of the shackle, closing said body. The contour of the cross section of the body of the shackle, as well as that of the links that link the said shackle, has been represented by dash lines.
Figure 3:
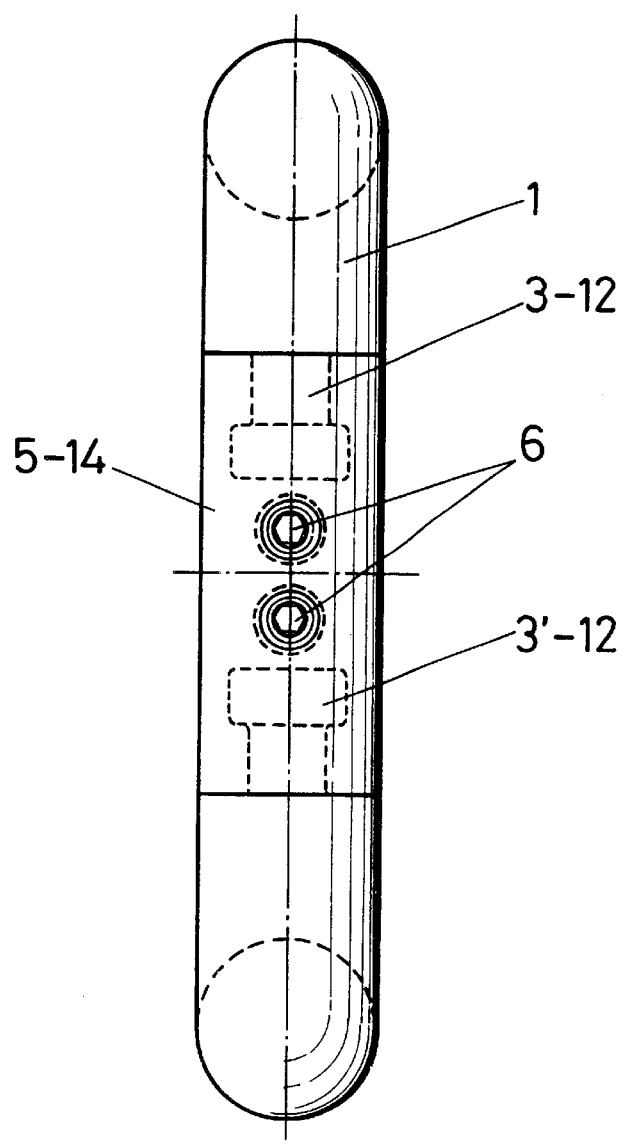
FIG. 3 represents a front raised view of the shackle represented in the preceding figure.

Specifically, the first piece (4) that is going to be located on the inside, as represented in FIG. 2, has a shape that can be considered to be prismatic-rectangular, with some concave cavities (7) on the inside part, so that in their positioning on the opening (2) of the body (1) of the shackle, they define a surface continuity with the inside concave curvature corresponding to each one of the ends of the passage (8) where the links that form the chain (9) link, it being possible to see in FIG. 2 how the contour or cross section of these links (9), which is circular, corresponds precisely with the contour or cross section of the body (1) of the shackle.

Figure 5:
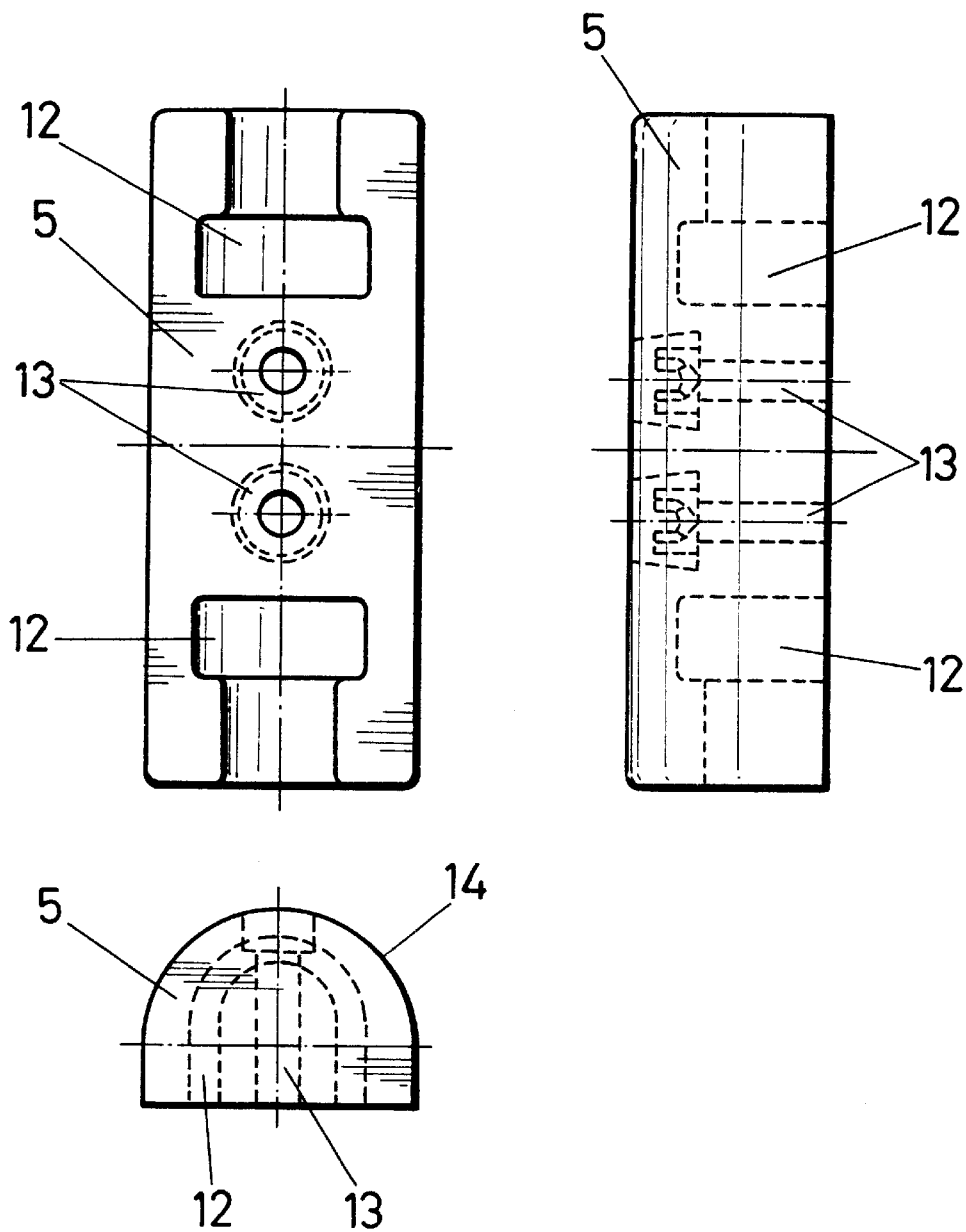
FIG. 5 shows a front raised view, another side view and another end view of the second place, specifically the one that is located on the outside, that close the opening of the body of said shackle.
Figure 6:
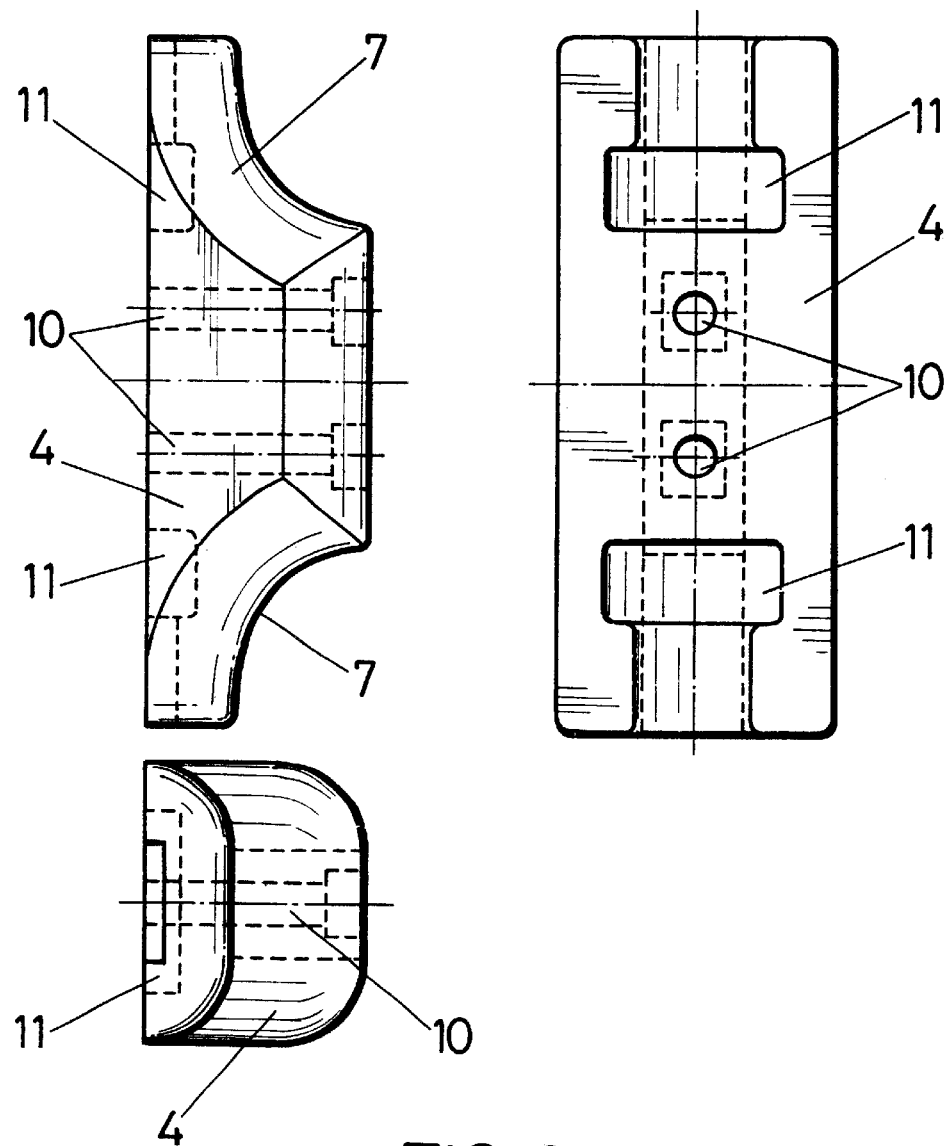
FIG. 6 shows a side raised view, another front view and another end view of the piece located on the inside that closes the opening of said body of the shackle.

This first piece (4) also has the corresponding passages (10) (shown in FIG. 6) for the screws (6), and on the contact surface of the piece (5) it has some recesses or cavities (11) that are complementary to other cavities (12) (shown in FIG. 5) belonging to piece (5), so that together and in accordance with the position facing each other for fastening together of the pieces (4) and (5), in the cavities (11) and (12) that have a stepping, the extensions (3–3') of the body (1) of the shackle are perfectly adapted.

Figure 4:
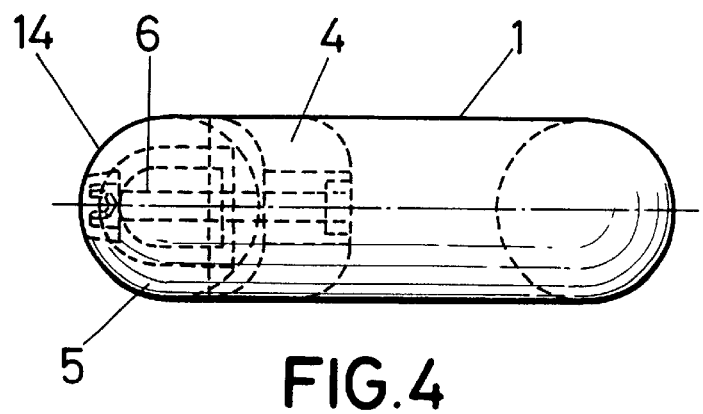
FIG. 4 shows a top plan view of the same shackle as that of the two preceding figures.

The second piece (5), that is on the outside of the opening (2) of the body (1), aside from the above mentioned stepped recesses or cavities (12), includes the passages (13), that are facing the extension of the passages (10) of the piece (4), for the fastening screws (6). These screws screw the pieces, or by means of the corresponding nuts, as represented in FIG. 2. The second piece (5) has on the outside a curvature (14) (shown in FIG. 4), corresponding with the one that the body (1) has, to provide an outside surface continuity and to form a chain link-shaped body, so that it moves correctly along the hollows of the drum corresponding to the pulley-capstan.

In this way, the body (1) of the shackle is closed in the opening (2) perfectly and effectively by means of the coupling of the first and second pieces (4) and (5), fastened together by means of the screws (6), by the adaptation of the stepped cavities (11–12) of said first and second pieces (4) and (5) on the extensions (3–3') of the opening (2) of the body (1) of the shackle. By virtue of the special described shape of these pieces (4) and (5), a surface continuity internally as well as externally of the body (1) of the shackle is given rise to, in order to be able not only to adapt the links that are linked to the same, but also in order to be able to slide by means of the hollows of the drum for which purpose it is necessary that the links pass for the tightening and release of the main chain.

Besides, the simple unscrewing of the screws (6) involves making pieces (4) and (5) independent from each other and therefore separated from the body (1) of the shackle, permitting the release of said body (1) from the links (9) to which it is linked, thus releasing the guide-chain that is previously linked to the main chain, to carry out the operations of tightening and releasing of the main chain.

What is claimed is:

1. A connecting shackle for chains comprising a chain link-shaped body having an inner surface surrounding an inner opening of the body, and an outer surface along a perimeter of the body, the body further comprising an opposing first end and a second end defining an open section therebetween, the first end and the second end being provided with respective extensions facing each other and protruding into said open section, each of said extensions having a perimetric step defining a first portion and a second portion of each extension, said second portion being an outermost section of each extension with a larger contour than said first portion, closing means for closing off said open section, said closing means comprising a first piece and a second piece, wherein said first piece closes off said open section with respect to said inner opening of the body, and said second piece closes off said open section with respect to said outer surface of the body, said first and second pieces are adapted for interlinking and fastening together by being shaped to provide continuity of surfaces alone an inside and an outside surface of the body, and said first and second pieces further comprising means for adaptation for receiving said extensions of the body, and said means for adaption includes having transversal holes in said first and second pieces for passage of respective screws for fastening said first and second pieces together.

2. A connecting shackle for chains according to claim 1, wherein the first and second pieces have a substantially prismatic-rectangular shape, an inner portion of the first piece protrudes into said inner opening, said inner portion having concave recesses defining a continuity in shape of a concavity of the inner surface of the body to form a passage for a chain link;

the second piece having an outside surface that is arched to define an outside curvi-convex continuity of the outer surface of the body;

the first and second pieces having abutting surfaces having stepped and complementary recesses defining together cavities in which the extensions of the first and second ends of the body are arranged.

3. A chain for the anchoring of ships comprising a plurality linked bodies, wherein at least one linked body includes a connecting shackle according to claim 1.

4. A chain utilized for anchoring of oil platforms comprising a plurality linked bodies, wherein at least one linked body includes a connecting shackle according to claim 1.

5. A connecting shackle for chains according to claim 1, wherein said connecting shackle provides a connecting means between links of a chain.

6. A connecting shackle for chains according to claim 1, wherein said connecting shackle links a chain to a guide-chain that cooperates in tightening a main chain.

7. A guide-chain for tensing a main chain comprising a connecting shackle according to claim 1.

* * * * *